United States Patent Office 3,303,349
Patented Feb. 7, 1967

3,303,349
CIRCUITS EMPLOYING ALTERNATORS
Walter Sinclair, Hemel Hempstead, and Walter Philipp, Ealing, London, England, assignors to Rotax Limited, London, England
Filed Mar. 20, 1963, Ser. No. 266,655
Claims priority, application Great Britain, Mar. 20, 1962, 10,587/62
2 Claims. (Cl. 307—58)

This invention relates to circuits of the kind comprising a pair of alternators, a pair of transformer-rectifier units to which the A.C. outputs from the alternators are fed respectively, a common load to which the D.C. outputs from said units are supplied, and a pair of voltage regulators for controlling the outputs from the alternators respectively.

It will be appreciated that with such a circuit, the alternators may also provide alternating current to other loads.

In order that the size of the transformer-rectifier units may be kept to a minimum, it is desirable that the current supplied to the load should be shared equally between the units. However, such a desideratum is difficult to achieve since it is not possible to ensure that the voltage regulators operate at exactly the same voltage. The voltage/current curves of the units will not therefore coincide, but will be parallel. The regulated voltage will fall slowly with increasing current, and although the two curves will be closely spaced, the difference in current for a given voltage will be marked.

The object of the invention is to provide in a convenient form a circuit in which these difficulties are minimised.

A circuit of the kind specified and in accordance with the invention includes means for obtaining a pair of voltage signals dependent on the output currents of the rectifier units respectively, and means operable by any difference between said signals for varying the voltage at which one of the alternators is regulated in a manner to decreased the difference between the output currents of said units.

Figure 1:
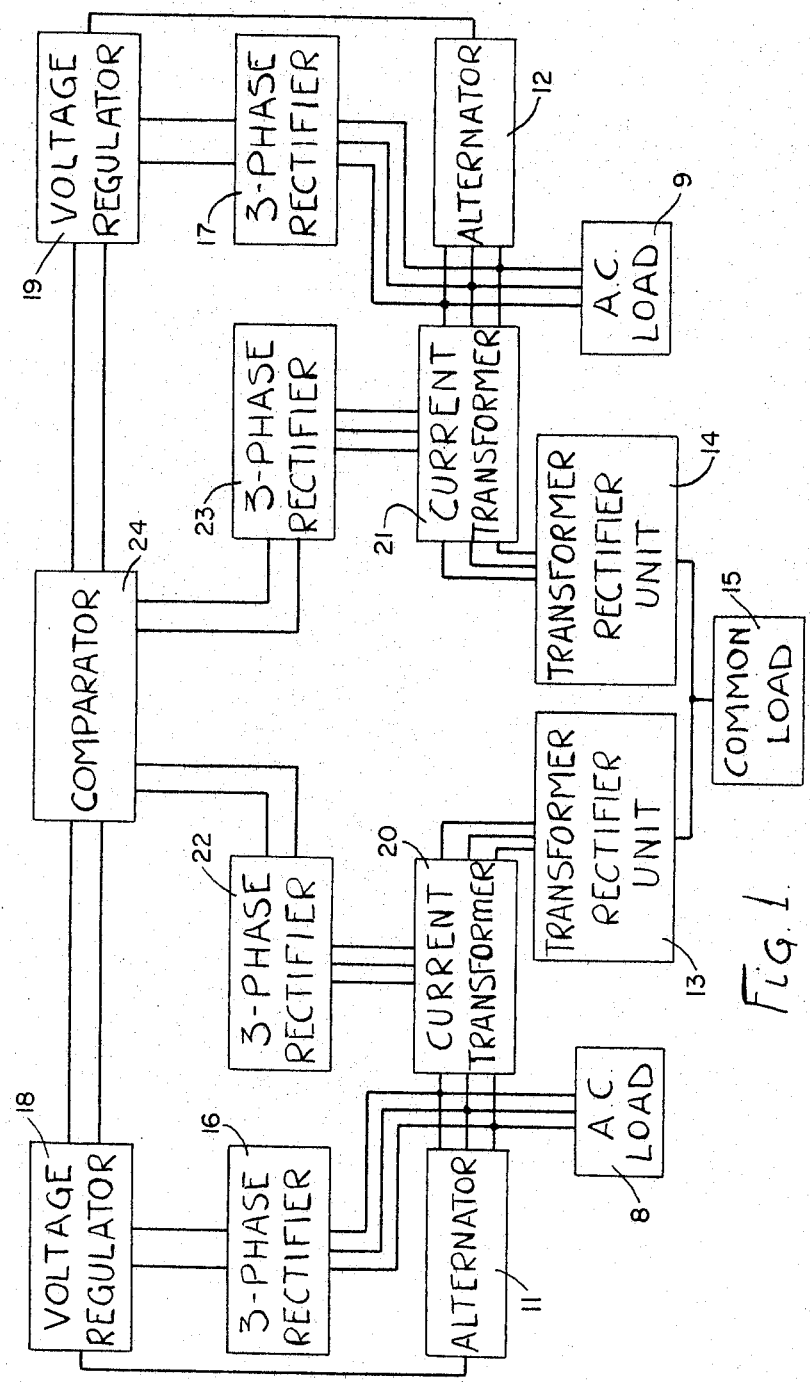
Figure 2:
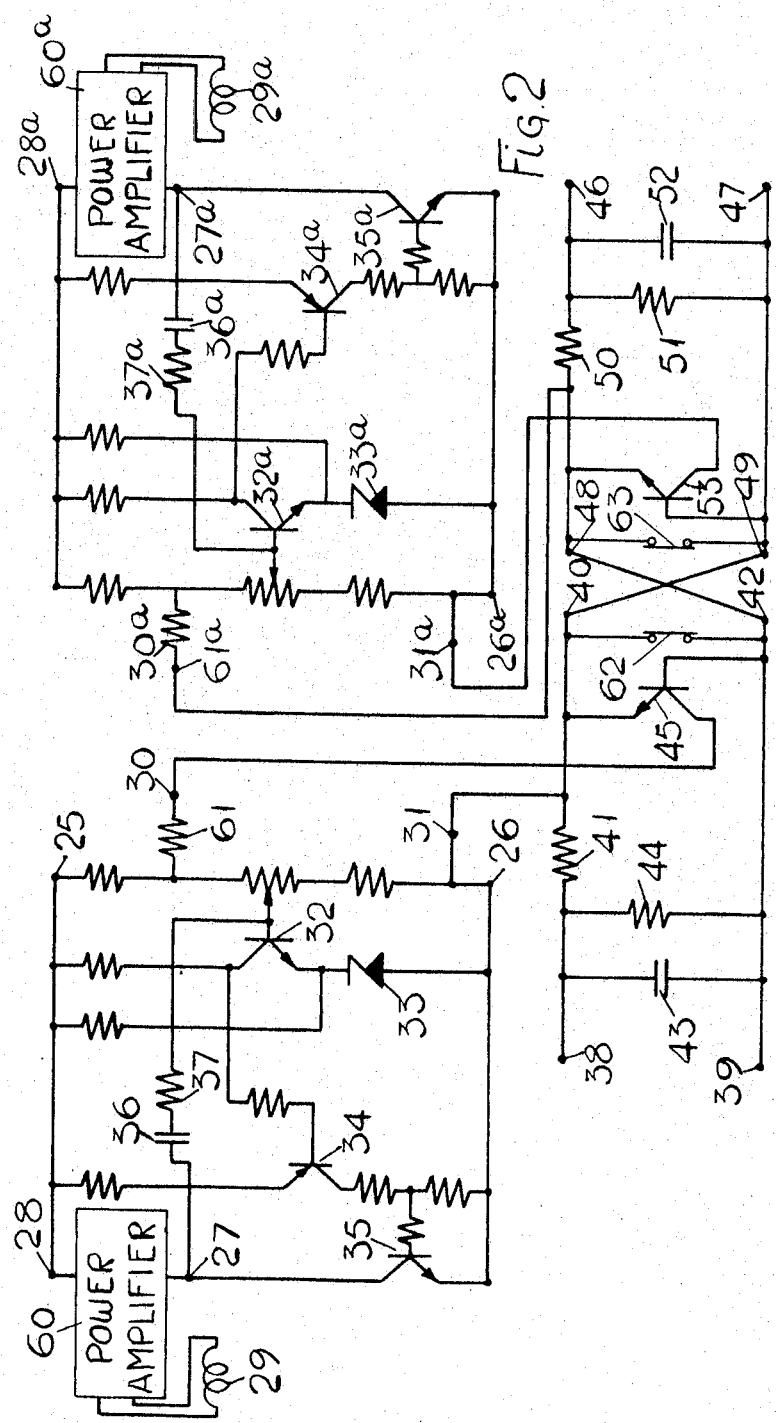

In the accompanying drawings FIGURE 1 is a block diagram illustrating diagrammatically one example of the invention, and FIGURE 2 is a circuit diagram showing the voltage regulators and comparator.

Referring first to FIGURE 1 there are provided a pair of three-phase alternators 11, 12 the outputs from which are fed through a pair of three-phase transformer-rectifier units 13, 14 to a common load 15. The outputs from the alternators 11, 12 are further fed through separate three-phase rectifiers 16, 17 to a pair of voltage regulators 18, 19 respectively for controlling the output voltages of the alternators. Moreover, the alternators provide alternating current to alternating current loads 8, 9 respectively.

Surrounding the input phase lines to the units 13, 14 respectively are a pair of three-phase current transformers 20, 21 the outputs from which are applied through three-phase rectifiers 22, 23 respectively to a comparator 24 for controlling the operation of the voltage regulators in a manner to be described.

Referring now to FIGURE 2, the voltage regulator 18 includes terminals 25, 26 connected to the rectifier 16, terminals 30, 31 connected to the unit 24, and terminals 27, 28 connected through a power amplifier 60 to the field coil 29 of the alternator 11. The amplifier 60 effects an inversion, so that increased current flow through the amplifier 60 results in decreased current flow through the winding 29.

The terminals 30, 31 are connected through a resistor 61 across part of a resistance chain bridging the terminals 25, 26. A portion of the voltage across terminals 25, 26 is applied to the base of a transistor 32, the emitter voltage of which is controlled by a Zener diode 33. When the voltage across terminals 25, 26 rises, an increased current flows through the transistor 32. This increase is amplified by the transistors 34, 35, and the increase in current flowing through the amplifier 60 results in a decrease in the current flowing through the winding 29. Similarly, a fall in the voltage across terminals 25, 26 results in an increased current flow through the winding 29.

The voltage regulator 19 is precisely similar to the regulator 18, and the components thereof have been designated with the same reference numerals followed by the suffix a. The field coil of alternator 12 is shown at 29a.

The unit 24 includes two similar parts. One part has terminals 38, 39 connected to the rectifier 22, a terminal 40 connected to terminal 38 through a resistor 41, and a terminal 42 connected to terminal 39. Terminals 38, 39 are bridged by a capacitor 43 and a resistor 44 in parallel, whilst terminals 40, 42 are connected to the emitter and base respectively of a transistor 45. The other part of the unit has terminals 46, 47 connected to the rectifier 23 and in addition terminals 48, 49, resistors 50, 51, a capacitor 52 and a transistor 53.

The terminal 48 is connected to the terminal 42 and also to the terminal 30a, and the terminal 40 is connected to terminals 49 and 31. Moreover, normally closed contacts 62, 63 operable by the alternators 11, 12 respectively are connected between the bases and emitters of the transistors 45, 53.

The arrangement is such that the voltages developed across the capacitors 43, 52 are dependent on the mean input currents to the units 13, 14 respectively, and hence these voltages are also dependent on the output voltages of units 13, 14. The interconnection of the terminals 40, 49 and 42, 48 ensures that only the transistor associated with the alternator passing the lower current to its unit will conduct. Hence, if the input current to the unit 13 is lower than the input current to the unit 14, current flows through the transistor 45 and between terminals 30, 31 in the voltage regulator 18. This current produces a voltage drop which reduces the current flow through the transistor 32 so that current flow through the winding 29 is increased. Current flowing through transistor 53 has a similar effect on the regulator 19 if the input current to the unit 14 is lower than the input current to the unit 13.

When both alternators 11, 12 are being used, contacts 62, 63 open upon starting of the alternators, and play no part in the operation of the apparatus. However, where one of the alternators is not in use, its associated contact 62 or 63 will remain closed, thereby short-circuiting one of the transistors 45, 53 so that the comparator 24 has no effect on the alternator in use.

The resistors 61, 61a limit the current flowing through transistors 45, 53 respectively, and so limit the maximum amount by which the voltage regulators can be adjusted.

In the example described, the regulated voltage of the alternator passing the lower current to its transformer-rectifier unit is increased. However, by slightly modifying the circuit so that current flow through the transistors 45, 53 to the regulators increases current flow through the appropriate transistor 32, 32a, it can be arranged that the regulated voltage of the alternator passing the higher current to its transformer-rectifier unit is decreased.

Having thus described our invention what we claim as new and desire to secure by Letters Patent is:

1. An alternating current system comprising in combination a first alternator having a field coil, a first alternating current load connected to said alternator, a voltage regulator connected to said alternator, said voltage regulator being sensitive to the output voltage of said alternator and varying the current flowing in the field coil of said alternator in a manner to maintain the output voltage of said alternator substantially constant, a second alternator having a field coil, a second alternating current load connected to said second alternator, a second voltage regulator connected to said second alternator, said second voltage regulator being sensitive to the output voltage of said second alternator and varying the current flow to the field coil of said second alternator so as to maintain the output voltage of said second alternator substantially constant, first and second transformer-rectifier units connected to said first and second alternators respectively, a common direct current load fed by said first and second transformer-rectifier units, means detecting the input currents to said first and second transformer-rectifier units thereby enabling the supplying of said alternating current loads and said common direct current load, a comparison circuit connected between said means and said voltage regulators, said comparison circuit detecting any difference between the input currents to said transformer-rectifier units and varying the setting of one of said voltage regulators in a manner to decrease said difference, and means in said comparison circuit limiting the amount by which the setting of said one voltage regulator can be varied.

2. An alternating current system comprising in combination a first alternator having a field coil, a first alternating current load connected to said alternator, a voltage regulator connected to said alternator, said voltage regulator being sensitive to the output voltage of said alternator and varying the current flowing in the field coil of said alternator in a manner to maintain the output voltage of said alternator substantially constant, a second alternator having a field coil, a second alternating current load connected to said second alternator, a second voltage regulator connected to said second alternator, said second voltage regulator being sensitive to the output voltage of said second alternator and varying he current flow to the field coil of said second alternator so as to maintain the output voltage of said second alternator substantially constant, first and second transformer-rectifier units connected to said first and second alternators respectively, a common direct current load fed by said first and second transformer-rectifier units, means detecting the input currents to said first and second transformer-rectifier units thereby enabling the supplying of said alternating current loads and said common direct current load, a comparison circuit connected between said means and said voltage regulators, said comparison circuit detecting any difference between the input currents to said transformer-rectifier units and varying the setting of one of said voltage regulators in a manner to decrease said difference, and switch means operable by said first and second alternators for disconnecting said comparison circuit unless both alternators are in use.

References Cited by the Examiner
UNITED STATES PATENTS

| | | | |
|---|---|---|---|
| 2,495,783 | 1/1950 | Sorensen | 307—58 |
| 2,917,638 | 12/1959 | Hulsey et al. | 307—57 |
| 2,972,058 | 2/1961 | Kahle | 307—57 |
| 2,983,825 | 5/1961 | Neupauer | 307—53 |
| 2,986,647 | 5/1961 | Britten | 307—57 |

ORIS L. RADER, *Primary Examiner.*

LLOYD McCOLLUM, *Examiner.*

L. R. CASSETT, T. J. MADDEN, *Assistant Examiners.*